Jan. 17, 1939.  A. ANDERSON  2,144,422
APPARATUS FOR SURVEYING BORE HOLES
Filed Aug. 7, 1935  3 Sheets-Sheet 3
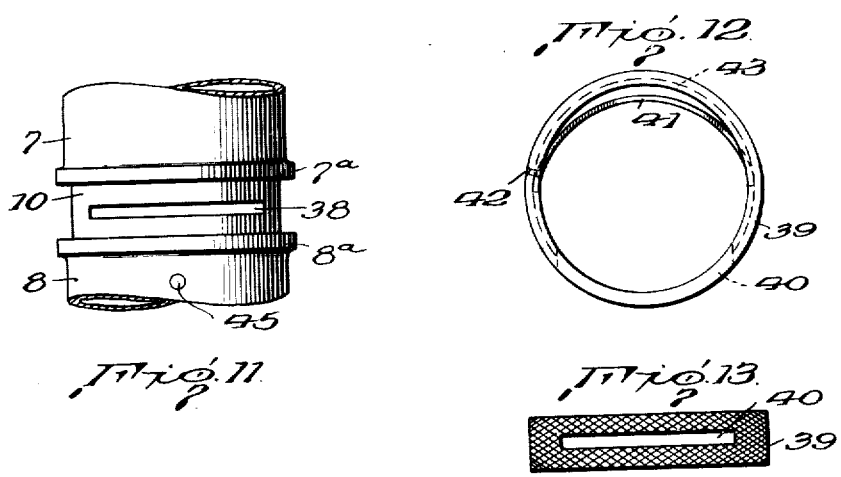
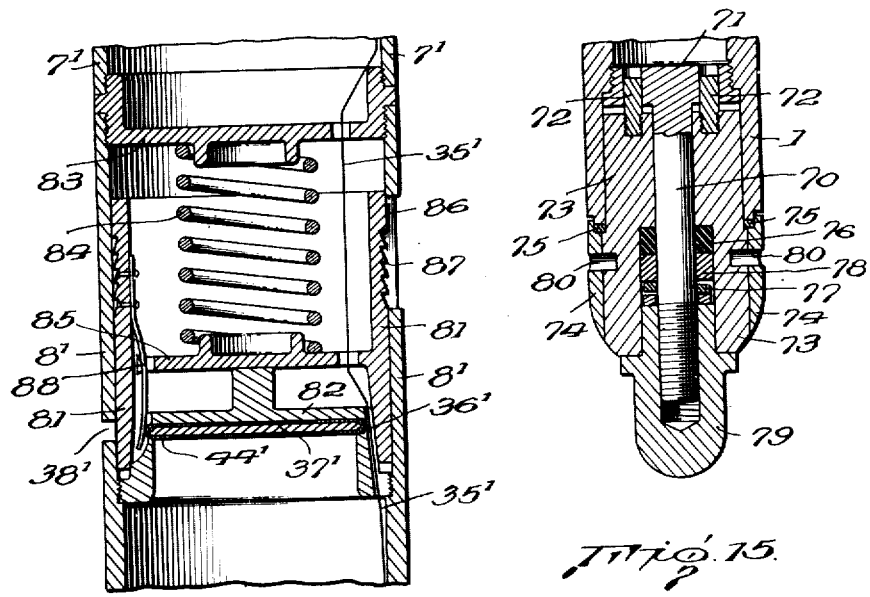
Inventor
Alexander Anderson,
By
Attorney.

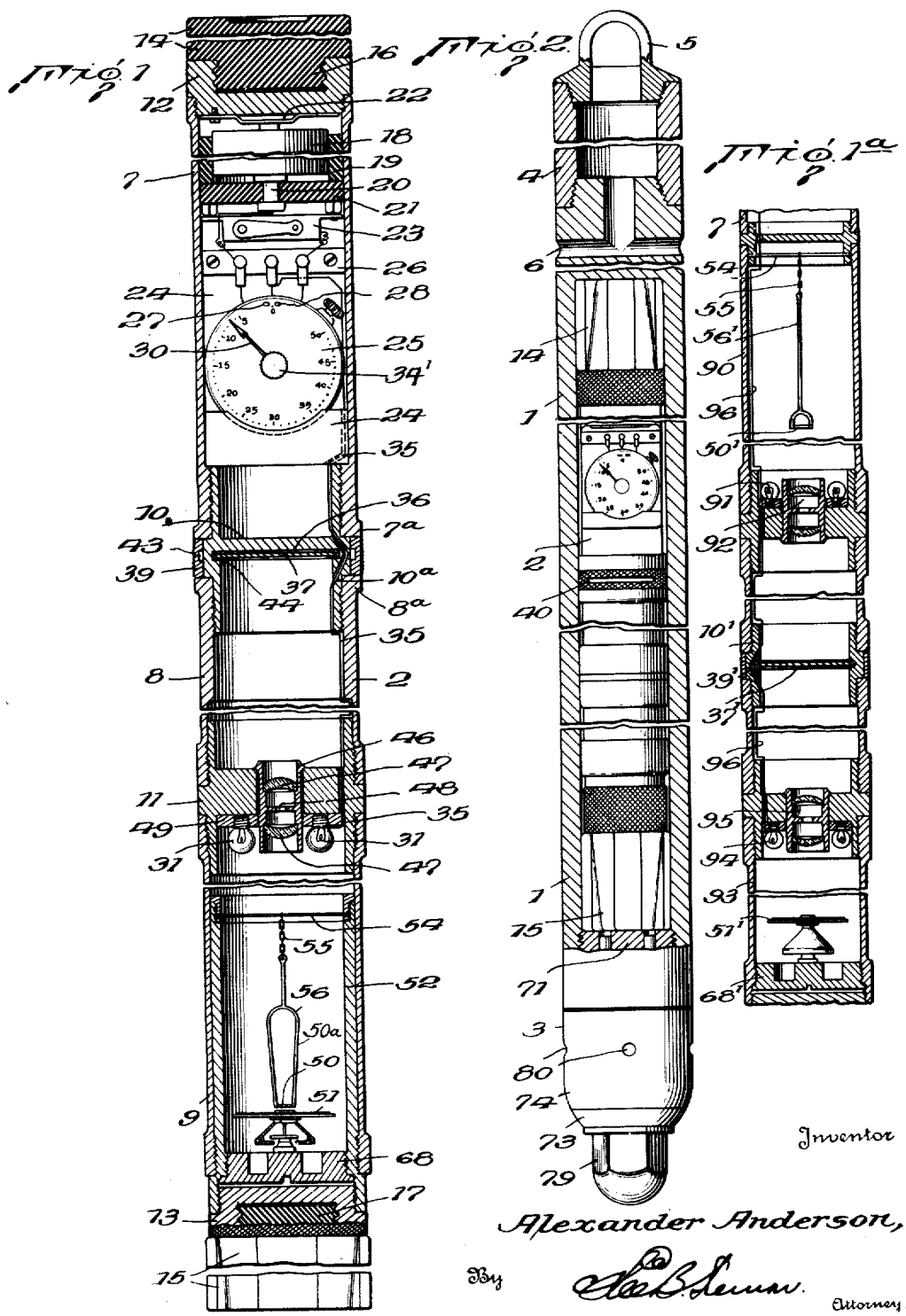

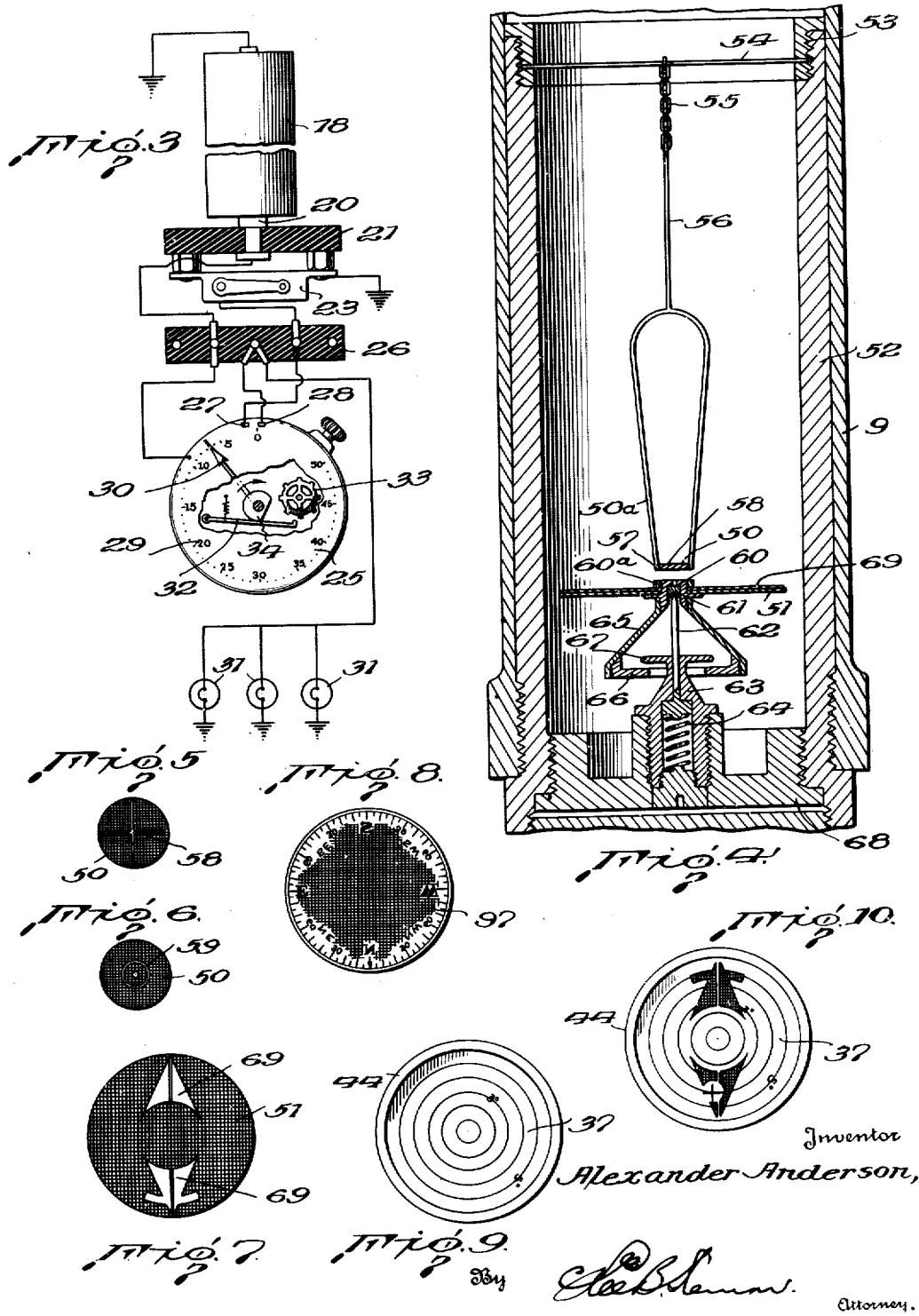

Patented Jan. 17, 1939

2,144,422

UNITED STATES PATENT OFFICE 2,144,422

APPARATUS FOR SURVEYING BORE HOLES

Alexander Anderson, Fullerton, Calif., assignor, by mesne assignments, to Lane-Wells Company, Los Angeles, Calif., a corporation of Delaware Application August 7, 1935, Serial No. 35,183

25 Claims. (Cl. 33—205.5)

This invention relates to improved methods and apparatus for the survey of bore holes, and is directed particularly to an instrument for making a record of inclination and direction of such inclination in the bore hole at any desired point therein.

Surveys of this nature have been made for a number of years, and have proven valuable for properly studying and directing the course of bore holes being drilled, and also for the determination of the course, and/or location of the bottoms of completed bore holes. A high degree of accuracy is essential in such surveys, because of property right controversies to be settled by such surveys, and because of the expense incurred in drilling operations which are apt to proceed in directions other than is intended.

It is, therefore, the object of this invention to provide an improved completely self-contained survey instrument, capable of making an accurate photographic record of the inclination and direction of such inclination in a bore hole.

It is the further object of this invention to provide a magnetic survey instrument automatically operable to photograph the relative positions of a plumb bob and a magnetic compass for simultaneously making a record of inclination and direction.

It is another object of the invention to provide an improved survey apparatus capable of withstanding the relatively high pressures existing in bore holes, and capable of producing an accurate record under the known adverse conditions of rough usage to which it is subject in bore holes.

It is also the object of this invention to provide an improved photographic record survey apparatus which is easily loaded and conditioned for use, and automatically operated without the necessity for the employment of highly skilled or trained operators.

It is a further object of the invention to provide an improved survey instrument of relatively small diameter that will readily pass into bore holes of small diameter, and yet be capable of producing an accurate record of bore hole inclinations and directions.

Another object of this invention is to provide a survey instrument with a water-tight casing having a closure or nose plug of novel design whereby bore hole liquids under high pressure may be excluded from the casing without the necessity of exerting great physical force in tightening and loosening the closure.

Another object of this invention is to provide a bore hole survey apparatus having a magnetic compass in combination with means for vibrating the apparatus after it has been brought to rest in a well for the purpose of causing a temporary reduction in the friction between the magnetic compass and its support to permit said compass to freely assume a truly magnetic direction.

Another object of this invention is to provide a bore hole survey apparatus, having a suspended plumb bob in combination with means for vibrating the apparatus after it has been brought to rest in a well for the purpose of causing a temporary reduction in the friction between adjacent members of the suspension to permit said plumb bob to assume a truly vertical position.

Another object of this invention is to provide a bore hole survey instrument having a magnetic compass supported for free rotational movement on a spring supported shock-absorbing pivot assembly.

Another object of this invention is the provision of light sensitive record discs having inclination degree circles photographically recorded thereon before said discs are inserted into the bore hole survey instrument, so that when the light sensitive record is developed after the survey record has been photographed upon it in the bore hole, the degree circles become visible along with the survey record and provide new and useful means of reading the record.

Another object of this invention is to provide a bore hole survey instrument in which the center of a circular photographic record disc may be easily located and held in place in the optical axis of the instrument and wherein a plumb bob is suspended from a point on said axis and the pivot of a magnetic compass is likewise mounted in said axis together with the optical axis of a lens.

Another object of this invention is to provide a photographic bore hole survey apparatus wherein inclinations are measured by photographing the position of a suspended plumb bob and wherein plumb bob assemblies of different suspension lengths may be easily interchanged, in order to assure obtaining an inclination record of greatest possible accuracy in any given range of inclination.

Another object of this invention is to provide a plumb bob support of relatively small area, said support being located in the path of light reflected from the plumb bob towards photographic recording means.

Another object of this invention is to provide a plumb bob which may be suspended above and close to the upper surface of a compass card, said plumb bob being provided with indicia adapted to reflect an image, which may be photographed simultaneously with indicia on the compass card to provide a composite record of inclination and direction.

A further object, including the above last stated object, is the provision of indicia on the plumb bob located above an opaque part of the bob, said opaque part serving as a light shield to prevent the reflection of light from the area of indicia on the compass card over which the opaque part of the plumb bob is suspended at the instant a photographic exposure is made. The light shield is provided to assure recording a clear and complete image of the plumb bob indicia, the size of the shield being so proportioned to the size of the indicia on the compass card that the recorded image of the compass card indicia is also substantially complete.

It is a further object of this invention to provide means for making a clear photographic image of light reflecting indicia carried by a plumb bob, the said means comprising a light sensitive member, a source of light, a lens of relatively large diameter, and a plumb bob supporting member of relatively small area. With the above combination, the major portion of the light reflected from the indicia of the plumb bob falls on the surface of the relatively large lens, and a small portion only is intercepted by the plumb bob supporting member and the other members of the plumb bob.

Another object of this invention is to provide a plumb bob suspended within a bore hole survey instrument from a rigid support of small area by means of a flexible suspension member; the length of said plumb bob being so proportioned with respect to the length of said flexible suspension member and the inside diameter of the instrument body that when the instrument is placed in an inverted position, the plumb bob can not pass by the suspension member and the rigid support and can therefore not become entangled with said suspension member and support.

Other objects and advantages of the invention will be apparent from the following detailed description of the embodiments of the invention shown in the accompanying drawings, wherein:

Figure 1 is a vertical section view of a preferred form of bore hole survey recording instrument.

Fig. 1A is a vertical section view of a modified form of bore hole survey recording instrument.

Fig. 2 is an elevation view of the entire survey apparatus with the outer casing partly cut away to show the position of the recording instrument within said casing.

Fig. 3 is a diagrammatic view of the electrical circuit and timing unit of the recording mechanism.

Fig. 4 is an enlarged vertical section view of the preferred form of plumb bob suspension and compass mounting.

Fig. 5 is an enlarged plan view of ore type of surface marking on the plumb bob.

Fig. 6 is an enlarged plan view of another example of plumb bob surface marking.

Fig. 7 is a plan view of a preferred form of compass card marking.

Fig. 8 is a plan view of another form of compass card indicia.

Fig. 9 is a plan view of a record disc of light sensitive material showing an example of the type of inclination circles which may be photographically applied to said disc before it is used in the recording apparatus.

Fig. 10 is a plan view of an exposed and developed record disc with a typical record of inclination and direction thereon.

Fig. 11 is a view showing the slot in an instrument coupling member for receiving and discharging the record disc.

Fig. 12 is a plan view of the ring used to close the slot shown in Fig. 11.

Fig. 13 is an elevation view of the ring shown in Fig. 12.

Fig. 14 is a vertical section view of a modified form of loading slot closure and record disc seat.

Fig. 15 is a vertical section view of the nose plug shown on the lower end of the water-tight case of the apparatus of Fig. 2.

Referring to the drawings, for the purpose of illustration, the survey apparatus (see Fig. 2) comprises a fluid-tight outer casing indicated by the numeral 1, a recording instrument 2, within the casing 1, a nose plug 3 at the lower end of the casing and a sinker bar 4 between the upper end of the casing 1 and the bail 5. The casing 1 is preferably made from solid duraluminum or other non-magnetic material which is bored to provide a cylindrical chamber to receive the recording instrument 2. The cylindrical chamber is of such a length that rubber cushions 14 and 15 on the ends of the instrument 2 are slightly compressed between the end of the chamber and end of the nose plug 3 and the instrument thereby resiliently supported within the casing. The nose plug 3 seals the chamber and prevents high pressure bore hole fluids from gaining access to the recording instrument. The details of this plug will be described hereinafter. The sinker bar 4 may consist of one or more joints of tubing suitably coupled together and detachably connected, as by screw-threads, to the upper end of the casing 1. A bail 5 is provided at the upper end of the sinker bar so that a sand line or cable (not shown) may be connected to the apparatus for lowering it into, and withdrawing it from a bore hole. Drain passages 6 may be provided in the upper end of casing 1 for permitting fluids to drain out of the tubular sinker bar as the apparatus is withdrawn from a bore hole.

Referring to Fig. 1 of the drawings, the recording instrument 2 is preferably constructed from a number of tubular sections 7, 8 and 9 of brass, manganese-bronze, or other non-magnetic material. The tubular sections are joined end to end by threaded coupling members 10 and 11, also of non-magnetic material. A cap 12 closes the upper end of the instrument and a similar cap 13 closes the lower end thereof. Soft, moulded rubber bumpers 14 and 15 are provided at the upper and lower ends respectively of the instrument. These bumpers may be secured to the caps 12 and 13 by molded connections 16 and 17 respectively. The rubber bumpers 14 and 15 are dimensioned to fit snugly within the outer casing 1, and serve to centralize and cushion the recording instrument therein.

The instrument 2 is divided into three compartments by the coupling members 10 and 11. The upper portion of the instrument is a control compartment, the middle portion a camera compartment, and the lower portion a compass and plumb bob compartment.

The upper or control compartment contains a source of electrical energy in the form of a suitable number of dry cell batteries 18, arranged end to end and insulated from the compartment wall 7 by an insulating sleeve 19. The batteries 18 are supported upon and have one terminal engaging a contact stud 20, carried by a bulkhead 21 of insulating material secured to the compartment shell 7 by screws (not shown). The upper terminal of the batteries 18 engages a contact spring 22 secured to the cap 12 thereby grounding this terminal upon the instrument casing. A buzzer 23 is secured to the lower side of the bulkhead 21. Also within the control compartment is a soft rubber block 24 having a recess therein to engage and resiliently hold a watch or time controlled switch 25. A terminal panel 26 of insulating material may also be carried by the block 24. The block 24 is preferably of a size to fit snugly within the tubular section 7 to which it is preferably secured by screws fitting metal nuts moulded into it (not shown). The tubular section 7 has a portion thereof cut away in the vicinity of the watch 25 and terminal panel 26 as shown in Fig. 2. This cut-out or opening in the compartment wall permits the watch to be wound and set prior to insertion of the instrument in the outer casing 1.

Referring to Fig. 3 which shows diagrammatically the mechanism in the control compartment, it will be noted that the upper terminal of the electrical energy supply 18 is grounded to the instrument casing. The other supply terminal is connected to the left post on the terminal panel 26 and thence to the metal case of the watch 25. Two contact studs, 27 and 28, are attached to the watch face and suitably insulated from each other and from the watch case. Stud 28 is placed at the zero mark of the minute scale 29. The contact stud 27 is placed close to, but somewhat spaced from stud 28, both studs being adapted to permit the minute hand 30 to first make sliding contact with stud 27 for controlling (closing and opening) the circuit through the metal watch case, hand 30, and stud 27 before closing the circuit through stud 28. While the hand 30 makes contact with stud 27, a circuit including the battery 20, the buzzer 23 and the instrument shell 7 is closed. The vibrations emanating from the buzzer 23 cause the whole instrument 2 located between the rubber bumpers 14 and 15 to vibrate for a short interval. These vibrations assist free and natural movement of the magnetic compass and the plumb bob assembly hereinafter described. The buzzer circuit is opened as the minute hand 30 of the watch leaves the contact stud 27, and when the hand contacts and passes over the stud 28, a circuit including the electric lamps 31 is closed to thereby energize or light these lamps for a brief period for making the photographic record hereinafter described. The watch 25 is preferably provided with an automatic stopping mechanism of the character shown in the cut-away portion of the watch face in Fig. 3. This mechanism comprises a spring-biased, pivotally mounted element 32, one end of which is adapted to engage and stop movement of the watch balance wheel 33 after the hand 30 has passed the contact stud 28. When the pivoted element 32 engages the flat side of the cam 34 on the shaft of the watch hand 30, the outer end of element 32 engages projections on the balance wheel 33 to stop the watch and prevent further recording until the instrument has been reloaded and reset. A knob 34', which projects through an opening in the watch crystal (see Fig. 1), may be provided for resetting the contact hand 30.

The coupling member 10 joining the tubular shell 7 to the tubular section 8 serves as a partition or bulkhead between the control compartment and the camera of the survey instrument. The coupling member 10 is provided with a small drilled passage 10a therethrough to allow the electrical conductor 35 to pass from the control compartment into the camera compartment and thence to the electric lamps 31. The coupling member 10 is also provided with a recessed semi-circular seat 36 in its lower side for receiving a disc 37 of sensitized film such as shown in Figure 9 and for holding such disc in a position normal to the instrument axis with the center of the disc in the instrument axis. A slot 38 (see Fig. 11) is provided in the side of the coupling member 10 and opposite the semi-circular seat 36, to allow lateral insertion or removal of the sensitized disc 37 to or from the disc seat 36. A ring 39 preferably knurled on its exterior surface, shown in Figs. 12 and 13, is rotatably mounted on the periphery of the coupling 10 between the shoulders 7a and 8a of the tubular sections 7 and 8 and in light-tight engagement therewith. The ring 39 is provided with a slot 40 which may be aligned with the slot 38 in coupling member 10 by rotation of the ring 39 to the proper position whenever a sensitized disc is to be inserted or withdrawn from the instrument. The ring 39 is also provided with a spring 41, fastened at one end to the inside of the ring at 42, and of a size to enter the internal groove 43 in the ring when the ring is turned to align slot 40 with slot 38. When the ring is thereafter rotated to close the slot 38, a part of the spring 41 then enters slot 38, engages the edge of the record disc 37, and holds and presses the record disc firmly against the semi-circular seat 36. When in this position the spring 41 also acts to keep the ring from further rotation.

The record disc 37 (see Fig. 9) is of ferro-type Celluloid, cardboard, or other material bearing a sensitized coating, and may be provided with a metal rim 44 to facilitate handling. The tubular section 8 may be provided with a socket indentation 45 adjacent the coupling 10 for the reception of a projecting pin on a suitable disc loading device (not shown) to properly align the loading device with the slot 40. The socket 45 may also be used to align developing apparatus with the slot 40 whereby an exposed record disc may be transferred directly from the seat 36 within the instrument into a developing tank temporarily clamped to the instrument.

A coupling member 11 is provided to join the tubular section 8 to the adjacent section 9 by suitable threads, or the like. The center of the coupling 11 is drilled or cored to provide an aperture in alignment with the axis of the recording instrument 2. A sleeve 46 extends through and is secured in the aperture of the coupling 11. A suitable lens system, such, e. g., as a pair of anastigmatic lenses 47 and a diaphragm 48 with an axial aperture are carried within the sleeve 46. An insulated annular member 49 carrying the lamps 31 extends around the lower end of the sleeve 46 in such a manner that the sleeve will shield the lenses 47 from the direct rays of the lamps 31. The annular member 49 is provided with suitable electrical connections to arrange the lamps 31 in parallel, and in circuit with conductor 35 and the metal instrument shell.

The lowermost, or compass and plumb bob, compartment 9 of the instrument contains a plumb bob 50a, supported immediately above and adjacent to the card 51 of a magnetic compass as shown in detail in Fig. 4. The compass and plumb bob support is preferably a removable tubular sleeve 52 within and threaded to the compartment shell 9. The upper end of the sleeve 52 carries a threaded ring 53 which in turn carries a cross wire or member 54. A short length of fine chain 55 or similar flexible element is secured to the cross wire 54, in the axis of the instrument, by soldering or the like. A length of stiff wire 56 is connected to the lower end of chain 55, and extends as a rigid element to the plumb bob base 50. In the preferred form shown in the drawings, the base 50 is a small circular metal plate which serves to carry indicia 58 or 59 and also acts as a light shield to intercept reflected light from that part of the compass card beneath it as illustrated in the completed record disc shown in Fig. 10. The plumb bob base 50 may be in the form of cross hairs or threads secured to a ring, a disc of opaque material being secured below the cross threads to act as a light shield. The suspension wire 56 may be of hairpin form at its lower end, as shown, or may be a single rigid wire extending from the chain 55 to the base 50 in any suitable manner.

The upper surface of the plumb bob base 50 shows indicia, as for example, white or light colored cross lines 58, as shown in Fig. 5, or may show a white dot and a white circle 59 surrounding the dot, as shown in Fig. 6, or any other suitable markings. In either case, the center of the markings is located vertically beneath the point of suspension of the chain 55 when the plumb bob hangs freely, and lies in the vertical axis of the instrument 2 when instrument is in a true vertical position. The length of the rigid section of wire 56 should be proportioned to the length of chain 55 and the inside diameter of the sleeve 52 so as to keep the plumb bob assembly from passing to the upper side of the supporting member 54 and becoming entangled around the member 54 when the instrument is inverted. In general, this length should be greater than the radius of the inside of the sleeve 52. The entire plumb bob and suspension are suitably darkened or blackened, with the exception of the white markings or indicia 58 or 59 defining the center point, so that the blackened parts will not be recorded during the photographing operation and only the white indicia 58 or 59 on the base 50 will be photographed.

The compass assembly includes a black or darkened circular card 51 having a white or light colored magnetized needle 69 on its upper side. The needle and card are secured on a central bushing 60 by a circular nut 60a. The end of bushing 60 and the nut 60a are also blackened. After the black card 51 and the white needle 69 are assembled and secured in place on the central bushing 60, an arcuate white marking or other identifying indicia is placed on the card 51 adjacent the south end of the magnetic needle 69 as shown in Fig. 7.

The compass jewel bearing 61 is secured in an axially located recess in the lower side of the bushing 60. The compass pivot 62 is slidably mounted in a bushing 63 suitably secured in the base 68 which in turn is threaded into the lower end of the sleeve 52. A spring 64 is provided between the lower end of the pivot member 62 and a plug in the end of bushing 63 for resiliently supporting the pivot 62 in the normal position shown in Fig. 4. The use of a resilient mounting for the pivot 62 serves to protect the jewel bearing 61 from sudden shock and thereby lengthens the useful life of the jewel and pivot point.

The central bushing 60 supporting the compass card and needle is provided with a depending bell-shaped skirt 65, having an inturned flange 66 extending beneath a keeper flange 67 on the bushing 63. This construction serves as a keeper to prevent extended movement of the compass with respect to its pivot 62, especially when the survey instrument is inverted but permitting the compass to assume a horizontal position when the instrument is in an inclined bore hole. When the instrument is used for surveying bore holes of relatively great inclination, the compass supporting base 68 may be held in a conventional gimbal ring mounting for greater accuracy.

It will thus be apparent that the entire compass and plumb bob assembly is supported from and within the tubular sleeve 52. By having a number of tubular sleeves 52 of different lengths, each containing a suspended plumb bob having a known length from the cross wire 54 to the indicia surface 58, it is possible to provide an individual plumb bob assembly of suitable length for each of several ranges of inclination, and thereby secure greater accuracy in any given range than could be obtained by the use of one plumb bob for all ranges of inclination.

The above described arrangement of whitened needle and black card beneath it is particularly adapted for use when the apparatus is relatively small in diameter. When the apparatus is of larger diameter the compass parts may be advantageously assembled as follows. The magnetic needle is clamped underneath a black compass card provided with a complete scale of graduations in white. In practice the card then appears as shown in Fig. 8 except that the graduations are white on a black background 97 instead of as drawn. With this arrangement the compass card and the magnetic needle may be readily secured to the bushing 60 with an angle between the north end of the needle and the card graduation marked "N", said angle being equal and opposite to the magnetic declination in the locality in which the instrument is being used. By this means, the photographic records obtained may be read in terms of true rather than magnetic bearings.

Referring now to the nose plug 3, shown in detail in Fig. 15, an anchor bolt 70 extends through the plug, and has, at its inner end, a mushroom head 71 threaded to internal threads in the outer casing 1 of the survey apparatus. One or more dowell pins 72 are secured in the upper end of the body portion 73 of the plug and these pins engage corresponding holes in the head 71 of anchor bolt 70, whereby rotation of the head is effected by rotation of the plug body 73. A band 74, of a hard metal, such as stainless non-magnetic alloy steel or the like, is secured preferably by shrinking on to the body portion 73 of the plug to resist wear and abrasion as the apparatus is lowered into or withdrawn from a bore hole. A packing ring 75 of rubber or the like is provided in an annular recess existing between the plug body 73, band 74, and the shouldered end of the apparatus casing 1, in order to seal the joint between the casing and the plug body. Also a packing ring 76 is provided on the anchor bolt 70 to seal the joint between the plug body 73 and the bolt. This packing 76 may be suitably compressed by a spring 77 bearing on the washer 78, and against the take-up nut 79. The holes 80 are provided in the plug body 73 for the use of a spanner wrench. The take-up nut 79 may be hexagonal with a rounded end.

The modified form of bore hole survey instrument shown in Fig. 1A is generally similar to the instrument shown in Fig. 1 with the exception of a rearrangement of the location of the plumb bob and compass assemblies with respect to the recording disc. The primed reference numerals of Fig. 1A indicate parts generally similar to described elements of Fig. 1. In the modified form of instrument the photographic record disc 37' is sensitized on both faces. The disc 37' may be seated in a coupling member 10' surrounded by a ring 39' similar to that described in connection with Fig. 1. A plumb bob 56' is suspended within the instrument shell 90 above the disc 37'. A suitable light source 91 and lens system 92 is located between the disc 37' and indicia on the bottom side of the plumb bob base 50' to cast a reflected image of said indicia on the upper side of said sensitized disc. The plumb bob base 50' may be supported from the support 54' by the flexible chain 55' and the rigid suspension member 56' of stiff wire as shown. The magnetic compass 51' is positioned within the instrument shell 93 below the photographic disc 37' on a pivot carried by the plug or bulkhead 68'. A light source 94 and lens system 95 is located between the compass 51' and the disc 37' to cast a reflected image of compass card indicia on the lower side of the sensitized disc. Light sources 91 and 94 may be connected together and the electrical conductor 35' pass upwardly through the instrument to a contact on a time switch in a control compartment above the plumb bob support 54'. Such control compartment and mechanism may be similar to that shown in Fig. 1.

Fig. 14 illustrates a modified form of record disc holder construction. In this modification, the disc receiving slot 38' is located in the upper part of the tubular section 8', and is closed by a movable sleeve 81 slidably disposed within the casing 8'. The semi-circular seat 36' for the disc 37' is located in a bulkhead 82, suitably secured to the casing 8'. A second bulkhead 83 is secured between the sections 7' and 8' above the sleeve 81, and a spring 84 is positioned between the upper bulkhead 83 and a cross member 85 of the sleeve 81 for biasing the sleeve into the position shown, thereby closing the loading slot 38'. An opening 86 in the casing 8' permits the sleeve 81 to be raised in order to open the slot 38'. This raising or lifting of the sleeve 81 may be effected by use of any small pointed tool, or by engagement of the operator's thumbnail against the grooved surface 87 of the sleeve. A spring 88 is secured to the inner side of the sleeve 81, and engages the rim 44' of the record disc 37' to hold the disc against its seat 36' in proper alignment with the axis of the instrument. The bulkheads 82, 83 and 85 may be drilled to provide a passageway for the electrical conductor 35' which extends from the control compartment to the camera compartment.

The method of operation of the above described preferred form of survey apparatus is as follows: The instrument 2 is removed from its outer casing 1 and a photographic disc loading device (not shown) is clamped over the coupling 10 of the instrument, and a sensitized disc 37 inserted in the instrument through slots 40 and 38. The ring 39 is then rotated to the shut position in which the spring 41 enters slot 38 to press the disc 37 against the semi-circular seat 36 and to hold the ring 39 in this position. The loading device may then be removed. Where a loading device is not available, it is obvious that the instrument may be loaded in a dark room or cabinet provided with means for excluding actinic light. After the sensitized disc is inserted in the instrument, the watch 25 is wound and set. The watch hand 30 should be set at the approximate number of minutes which will be required for lowering the apparatus in the bore hole to the level of the desired survey reading, plus three or four minutes additional. The instrument is then inserted in the chamber in the outer casing 1. The take-up nut 79 of nose plug 3 is loosened a few turns and the plug inserted in the end of the casing, when the body portion 73 may be turned until the threaded head 71 is secure in the threads of the casing 1. A spanner wrench may be used for this purpose, but ordinarily, tightening by hand is usually sufficient. The take-up nut 79 is then tightened by the use of a small wrench until the packing 75 is compressed in its confining groove. The device is now ready to be run into the bore hole. A sand line, cable, or the like is secured to the bail 5, the apparatus is secured to the sinker bar, and is lowered into the bore hole, by means of the sand line, until it reaches the level at which the survey is to be made. The apparatus should reach the desired level two or three minutes before the recording operation is to take place, provided the estimated schedule of its lowering has been maintained. The operator can note the time by his own watch when the instrument watch was set prior to insertion in the bore hole, and by adding to his watch time the number of minutes which was set on the instrument watch 25, he will thus know precisely when the recording operation will occur.

Assuming that the instrument reaches the survey level at the estimated time, thereafter, and generally two or three minutes later, the contact hand 26 engages the contact stud 27, closing the electrical circuit to the buzzer 23, which then operates for a short period of time in order to jar the magnetic compass 51 on its pivot 62 sufficiently to free the compass needle to permit it to assume a position in the magnetic meridian and to insure that the plumb bob freely hangs straight and true.

During the quiet interval before the buzzer is operated both the compass and plumb bob come to rest. The vibration of the instrument produced by the buzzer does not cause either the plumb bob or the compass to commence visible swinging, but vibrates them sufficiently to overcome any frictional resistance which might otherwise prevent their natural movement to their true unbiased positions. As the watch hand continues its movement, the buzzer circuit is opened and another interval of quiet or rest ensues. When the watch hand 30 engages the contact stud 28, the circuit including lamps 31 is momentarily closed to energize the lamps 31 to illuminate the indicia marking 58 on the plumb bob base 50, and also to illuminate the marking 69 on the compass card 51. The light reflected by both these markings, passes through the lenses 47 and aperture 48 to the light sensitive disc 37 and a composite photographic image thereof is recorded on said disc. The plumb bob supports 54, the chain 55 and the wire 56 being black or darkened, and out of the focus of the lenses 47 do not photograph. As the watch hand 30 moves beyond the stud 28 the lamp circuit is opened, and shortly thereafter the watch is automatically stopped by engagement of the element 32 with the balance wheel 33, as hereinbefore explained. Stopping of the watch 25 prevents its further recording operations until the watch is reset.

The operator is able to tell when the recording operation takes place by observing his watch as explained, and thereafter the survey apparatus may be removed from the bore hole. When the apparatus reaches the surface, the nose plug 3 is removed from the outer casing 1, and the recording instrument withdrawn from within said casing. A light-tight developing tank (not shown) may be clamped on the instrument, about the ring 39, which latter is then rotated to align slots 38 and 40 and thereby allow the exposed record disc 37 to drop or slide into the developing tank. Suitable developing and fixing fluids are run into the developing tank after which the developed record disc bearing record of inclination and direction of such inclination, such as shown in Fig. 10, is removed for reading.

Since the record disc 37 is developed as a photographic negative, the white marking on the plumb bob and on the compass card appear as a black record on the developed disc. The disc may be placed in a suitable reader device and the correct direction and angle of inclination of the bore hole at the level at which the exposure was made may then be read and noted on the back of the record disc if desired.

The sensitized record disc 37 may be photographically printed with concentric circles indicating angles of inclination before being placed in the survey instrument. Such marking, as shown in Figs. 9 and 10, facilitates reading the amount or degree of inclination after the record is made. The concentric inclination angle circles may be conveniently printed on the sensitized disc from a suitable photographic negative provided with properly spaced circles before the discs are loaded into the survey instrument. In such case, the subsequent developing operation brings out the concentric degree circles as well as the images of plumb bob and compass card markings.

The method of operation of the modified instrument shown in Fig. 1A is the same as for the preferred form of instrument. The modified instrument, however, produces a composite record of inclination and direction, the inclination record being on one side of the record disc and the direction record on the reverse side. Such a record may be easily read by holding the printed record up to the light or by using a pin or the like to punch the inclination record through the developed disc for reading in conjunction with the direction record. One of the advantages of the modified form of instrument shown in Fig. 1A is that the length of the plumb bob is independent of the focal length of the lens and thus permits the use of a long plumb bob for greater accuracy in the survey of bore holes having relatively small inclination.

Although the preferred forms of survey apparatus shown and described herein relate to an instrument for making a single survey record at each operation thereof, it is obvious that a strip of film may be substituted for the described disc, and the strip advanced periodically as is well known in the art for obtaining a series of composite photographic records of the inclination and/or direction of a bore hole at a plurality of points along the length thereof.

This invention also contemplates the use of other equivalent types of couplings, compasses, timing units, and the like, as it will be apparent to one skilled in the art that such variations are possible.

I claim:

1. In a bore hole survey apparatus for making a photographic record of the inclination of a bore hole at a desired point along the length thereof, the combination comprising, a sealed casing, a fixed support within said casing, a plumb bob suspended within said casing from a point on said support, light reflecting indicia on said plumb bob defining a point thereon in vertical alignment with said point of support, and photographic means within said casing above said support, said photographic means including a light source, a lens system including a lens of such size that the fixed support and the parts of the plumb bob above the indicia will not materially reduce the amount of light reflected from the indicia onto the surface of the said lens, and a light sensitive member on the opposite side of said lens system for receiving a reflected image of the indicia on said plumb bob substantially free of interference from images of said support and plumb bob parts.

2. In a bore hole survey apparatus for making a photographic record of the inclination of a bore hole at a desired point along the length thereof, the combination comprising, a sealed casing, a fixed support with a point thereon in the axis of said casing, a flexible suspension element having one end secured to said support at a point in the axis of said casing, an elongated rigid plumb bob suspended from the other end of said flexible element, light reflecting indicia carried by said plumb bob defining a point vertically beneath said point of support, and photographic means within said casing and above said point of support, said photographic means including a light source, a lens focused on said indicia and out of focus with said support and flexible element, and a light sensitive member in the focus of said lens for receiving a reflected image of the indicia carried by said plumb bob substantially free of interference from images of said support and flexible element.

3. In a bore hole survey apparatus for making a photographic record of the inclination and direction of a bore hole at a desired point along the length thereof, the combination comprising, a photographic record making instrument and a housing for the same, the said housing having a slot in one side thereof for the insertion of a light sensitive disc to receive the record, a disc seat within said housing opposite said slot, to receive and align a disc within the said record making instrument, movable means associated with and carried by said housing for closing said slot and manually operable to open said slot, means tending to retain said first-mentioned means in the normal closed position and means within said housing for operating said instrument for making a record on a disc positioned in said disc seat.

4. A camera assembly for use in a bore hole survey instrument, said assembly comprising, a camera including a lens and a light sensitive record member, said camera having a slot in one side thereof for the insertion of said record member into said camera, a record member seat within said camera opposite said slot to receive and align said record member, movable means associated with said camera for closing said slot and operable to open said slot, a resilient member for normally retaining said means in the slot closing position, and time control means for operating said camera for making a record of inclination on a record member positioned on said seat.

5. In a bore hole survey apparatus for photographically making a record of the inclination of a bore hole at a desired point along the length thereof, the combination comprising, a photographic record making instrument and a housing enclosing the same, the said housing having a slot in one side thereof for the insertion of a disc to receive the record, movable means carried by said housing for closing said slot, resilient means tending to retain said movable means in the closed position, a seat within said housing opposite said slot to receive and align a disc of light sensitive material with the said record making instrument and means within said housing for operating said instrument for making a photographic record on a disc of light sensitive material positioned on said disc seat.

6. In a bore hole survey apparatus for photographically making a record of the inclination of a bore hole at a desired point along the length thereof, the combination comprising, a photographic record making instrument and a housing enclosing the same, the said housing having a slot in one side thereof for the insertion of a disc of light sensitive material to receive the record, movable means carried by said housing for closing said slot, resilient means tending to retain said movable means in the closed position, a seat within said housing opposite said slot to receive and align said disc within the said record making instrument, resilient means engaging the edge of said disc to hold said disc against said seat and means within said housing for operating said instrument for making a photographic record on a disc of light sensitive material positioned on said disc seat.

7. In a bore hole survey apparatus for making a record of the inclination and the direction of inclination of a bore hole at a desired point along the length thereof, the combination comprising, a record making instrument and a housing for the same, the said housing having a slot in one side thereof for the insertion of a disc to receive the record, a ring rotatable on and carried by said housing for closing said slot, said ring having a slot in one side thereof in alignment with said first-mentioned slot when said ring is rotated to an open position, means tending to retain said ring in the slot closing position and means within said housing for operating said instrument for making a record on a disc inserted in said instrument through said slots.

8. In a bore hole survey apparatus for making a record of inclination and the direction of inclination of a bore hole at a desired point along the length thereof, the combination comprising, a photographic record making instrument and a housing for the same, the said housing having a slot in one side thereof for the insertion of a light sensitive disc to receive the record, a disc seat within said housing opposite said slot, a sleeve within said housing axially movable with respect to said slot, means tending to retain said sleeve in a position overlying and closing said slot, the said housing also having an opening therein through which the said sleeve can be engaged for movement against said means, and means within said housing for operating said instrument for making a photographic record on a light sensitive disc previously inserted in said instrument through said slot.

9. In a bore hole survey apparatus, the combination comprising, a hollow outer casing for enclosing a recording instrument, and a removable plug closing the end of said casing to seal the same against entrance of bore hole fluids into said casing and to support said recording instrument, said plug comprising, an anchor bolt removably secured in said casing, a body portion movable on said bolt and having an annular groove adjacent the end of said casing, a gasket seated in said groove, and means cooperating with said anchor bolt to force said body portion toward said casing for compressing said gasket within said groove.

10. In a bore hole survey apparatus for making a record of the inclination of a bore hole at a desired point along the length thereof, the combination comprising, a hollow outer casing for enclosing a survey instrument, and a removable plug for the end of said casing to seal the same against entrance of bore hole fluids into said casing, and to support said survey instrument, said plug comprising, an anchor bolt having an enlarged head removably secured in said casing, a body portion movable on said anchor bolt and provided with projections engaging said bolt head whereby said head is rotated when said body portion is turned, a packing ring arranged between the lower end of said casing and the said body portion, a second packing ring arranged between said anchor bolt and said body portion, and means cooperating with said anchor bolt to force said body portion toward said casing to compress said first-mentioned packing.

11. In a bore hole survey apparatus for making a record of the inclination of a bore hole at a desired point along the length thereof, the combination comprising, a hollow outer casing for enclosing a survey instrument and a removable plug for the end of said casing to seal the same against entrance of bore hole fluids into said casing, and to support said survey instrument, said plug comprising, an anchor bolt having an enlarged head removably secured in said casing, a body portion movable on said anchor bolt and provided with projections engaging said bolt head whereby said head is rotated when said body portion is turned, a packing ring arranged between the lower end of said casing and the said body portion, a second packing ring arranged between said anchor bolt and said body portion, means engaging said anchor bolt and said body portion to force said body portion toward and into said casing whereby said first-mentioned packing is compressed between said body portion and the end of said casing, and resilient means between said first-mentioned means and said second packing to press said packing against the body portion and the anchor bolt.

12. In a bore hole survey apparatus for making a record of inclination and direction at a desired point along the length thereof, the combination comprising a sealed casing, a recording instrument including movable parts within said casing, said casing being adapted to be lowered in the bore hole to any desired depth therein, means within said sealed casing for jarring said instrument at a predetermined time to insure exact positioning of said parts in said instrument and means for making a record of the position of said parts at a predetermined time after the operation of said jarring means.

13. In a bore hole survey apparatus for making a photographic record of inclination and direction at a desired point along the length thereof, the combination comprising a recording instrument including movable parts adapted to be positioned in the bore hole at the desired survey level, a vibrator within said instrument operable at a predetermined time to insure free movability of said parts in said instrument, and means for taking a direct photograph of the position of said moving parts in said instrument after the operation of said vibrator.

14. In a bore hole survey apparatus for making a photographic record of the inclination and direction of inclination of a bore hole at a desired point along the length thereof, a photographic recording instrument comprising, a freely suspended plumb bob, a magnetic compass resiliently supported beneath said plumb bob, photographic recording means arranged above said plumb bob and compass, an electric lamp mounted above said plumb bob for illuminating both the plumb bob and the said compass, an electric vibrator mounted within said instrument, a source of electrical energy contained within the instrument and time control means adapted to energize the said vibrator and said lamp at predetermined times to first jar said instrument and thereafter operate said photographic means to make a record of the position of said plumb bob and said compass.

15. In a bore hole survey apparatus for making a photographic record of the inclination and direction of inclination of a bore hole at a desired point along the length thereof, the combination comprising, a sealed casing, a photographic recording assembly supported therein, the said assembly including a sensitized record member, preprinted inclination scale indicia thereon and a source of light, a plumb bob suspended within said casing from a point of support in vertical alignment with respect to the zero inclination point of said scale indicia, a magnetic compass also mounted within said casing and so positioned therein relative to the plumb bob and said source of light, that the compass and plumb bob will reflect a composite image on the said record member with said compass image centered with respect to said scale indicia, and time control means within the casing for operating the said recording assembly for photographically recording the said composite image.

16. In a bore hole survey apparatus for making a photographic record of the inclination and direction of inclination of a bore hole at a desired point along the length thereof, the combination comprising, a sealed casing, a photographic recording assembly supported therein, the said assembly including a lens, a source of light and a sensitized record member, a plumb bob suspended within said casing from a point of support in coaxial alignment with a point on said member corresponding to zero inclination of the apparatus, indicia on a surface of said plumb bob defining a point vertically beneath said point of support, a magnetic compass mounted within said casing, a background member supported with said compass, azimuth indicia on said member, said member having an area exceeding the effective range of inclination of said plumb bob, whereby the plumb bob image appears within the boundary of said background member image.

17. A well surveying apparatus comprising: a compass; a plumb bob; a sensitized record member adapted to receive the reflected images of said compass and plumb bob; said plumb bob being interposed between said compass and record member and bearing a mask adapted to cover a portion of said compass thereunder; said record member bearing inclination scale means adapted to appear in part within the area of said mask for coaction with said plumb bob image.

18. A well surveying apparatus comprising: a sensitized record member; a plumb bob element having a substantially planular reflecting surface marked to indicate a point; a lens system adapted to focus the image of said reflecting surface onto said record member; and a skeletonized framework for supporting and suspending said plumb bob element, said framework interposed between said plumb bob and lens system in out-of-focus relation and bearing such dimensions with respect to said lens that the image of said reflecting surface on said record member is unimpaired.

19. A well surveying apparatus comprising: a sensitized record member; a plumb bob element; a lens system adapted to focus the image of said plumb bob element onto said record member; a skeletonized framework for supporting and suspending said plumb bob element, said framework interposed between said plumb bob and lens system in out-of-focus relation and bearing such dimensions with respect to said lens that the image of said plumb bob element on said record member is unimpaired; said record member bearing an inclination scale having a zero point in registry with the point of suspension of said plumb bob element.

20. A well surveying apparatus comprising: a sensitized record member; a plumb bob element; a lens system adapted to focus the image of said plumb bob element onto said record member; a skeletonized framework for supporting and suspending said plumb bob element, said framework interposed between said plumb bob and lens system in out-of-focus relation and bearing such dimensions with respect to said lens that the image of said plumb bob element on said record member is unimpaired; said record member bearing an inclination scale having a zero point in registry with the point of suspension of said plumb bob element; and a compass positioned below said plumb bob element, but also substantially in the focus of said lens system whereby its image is reflected on said record member compositely with said plumb bob image.

21. A well surveying apparatus comprising: a sensitized record member; a plumb bob element; a lens system adapted to focus the image of said plumb bob element onto said record member; a skeletonized framework for supporting and suspending said plumb bob element, said framework interposed between said plumb bob and lens system in out-of-focus relation and bearing such dimensions with respect to said lens that the image of said plumb bob element on said record member is unimpaired; said record member bearing an inclination scale having a zero point in registry with the point of suspension of said plumb bob element; a compass positioned below said plumb bob element, but also substantially in the focus of said lens system whereby its image is reflected on said record member compositely with said plumb bob image; and a mask carried by said plumb bob to cover the portion of said compass thereunder, said inclination scale adapted to appear in part within the area of said mask for co-action with said plumb bob image.

22. A well survey apparatus comprising: an indicating instrument having a sensitive movable element; a device for vibrating said element sufficiently to minimize friction and permit said element to establish a true indicating position; and means for recording the position of said instrument after operation of said device.

23. A well surveying instrument comprising: a plumb bob suspended in and having a predetermined effective range of inclination with respect to said wall; a compass structure including a compass needle and a compass card, said compass card having an area at least equal to the effective range of said plumb bob to form a background therefor; and a photographic recording means disposed on the opposite side of said plumb bob from said compass structure, adapted to receive a composite image of said plumb bob, compass needle and compass card.

24. A well surveying instrument comprising: a photograhic recording means; a plumb bob support; a compass support arranged coaxially with respect to said plumb bob support; a compass structure on said compass support and tending to assume a horizontal position, said compass structure including a compass card forming a background embracing the effective range of movement of said plumb bob; and a plumb bob suspended from said plumb bob support tending to assume a vertical position and having a predetermined effective range of movement with respect to said common axis.

25. In a well surveying instrument: a shell; cross wire secured therein; a plumb bob structure including a wire stem flexibly connected with and suspended from said cross wire; a U-shaped wire yoke secured to said stem with its legs depending; a ring carried at the lower end of said yoke; cross hairs supported by said ring and defining a plumb bob center; a photographic recording means above said plumb bob center; and lens means rendering said plumb bob center in focus on said recording means and the remainder of said plumb bob structure out of focus.

ALEXANDER ANDERSON.

CERTIFICATE OF CORRECTION.

Patent No. 2,144,422. January 17, 1939.

ALEXANDER ANDERSON.

It is hereby certified that error appears in the printed specification of the above numbered patent requiring correction as follows: Page 8, second column, line 74, claim 23, for the word "wall" read well; and that the said Letters Patent should be read with this correction therein that the same may conform to the record of the case in the Patent Office.

Signed and sealed this 14th day of March, A.D. 1939.

Henry Van Arsdale.

(Seal) Acting Commissioner of Patents.

card having an area at least equal to the effective range of said plumb bob to form a background therefor; and a photographic recording means disposed on the opposite side of said plumb bob from said compass structure, adapted to receive a composite image of said plumb bob, compass needle and compass card.

24. A well surveying instrument comprising: a photograhic recording means; a plumb bob support; a compass support arranged coaxially with respect to said plumb bob support; a compass structure on said compass support and tending to assume a horizontal position, said compass structure including a compass card forming a background embracing the effective range of movement of said plumb bob; and a plumb bob suspended from said plumb bob support tending to assume a vertical position and having a predetermined effective range of movement with respect to said common axis.

25. In a well surveying instrument: a shell; cross wire secured therein; a plumb bob structure including a wire stem flexibly connected with and suspended from said cross wire; a U-shaped wire yoke secured to said stem with its legs depending; a ring carried at the lower end of said yoke; cross hairs supported by said ring and defining a plumb bob center; a photographic recording means above said plumb bob center; and lens means rendering said plumb bob center in focus on said recording means and the remainder of said plumb bob structure out of focus.

ALEXANDER ANDERSON.

CERTIFICATE OF CORRECTION.

Patent No. 2,144,422. January 17, 1939.

ALEXANDER ANDERSON.

It is hereby certified that error appears in the printed specification of the above numbered patent requiring correction as follows: Page 8, second column, line 74, claim 23, for the word "wall" read well; and that the said Letters Patent should be read with this correction therein that the same may conform to the record of the case in the Patent Office.

Signed and sealed this 14th day of March, A.D. 1939.

Henry Van Arsdale.

(Seal) Acting Commissioner of Patents.